Figure 1:
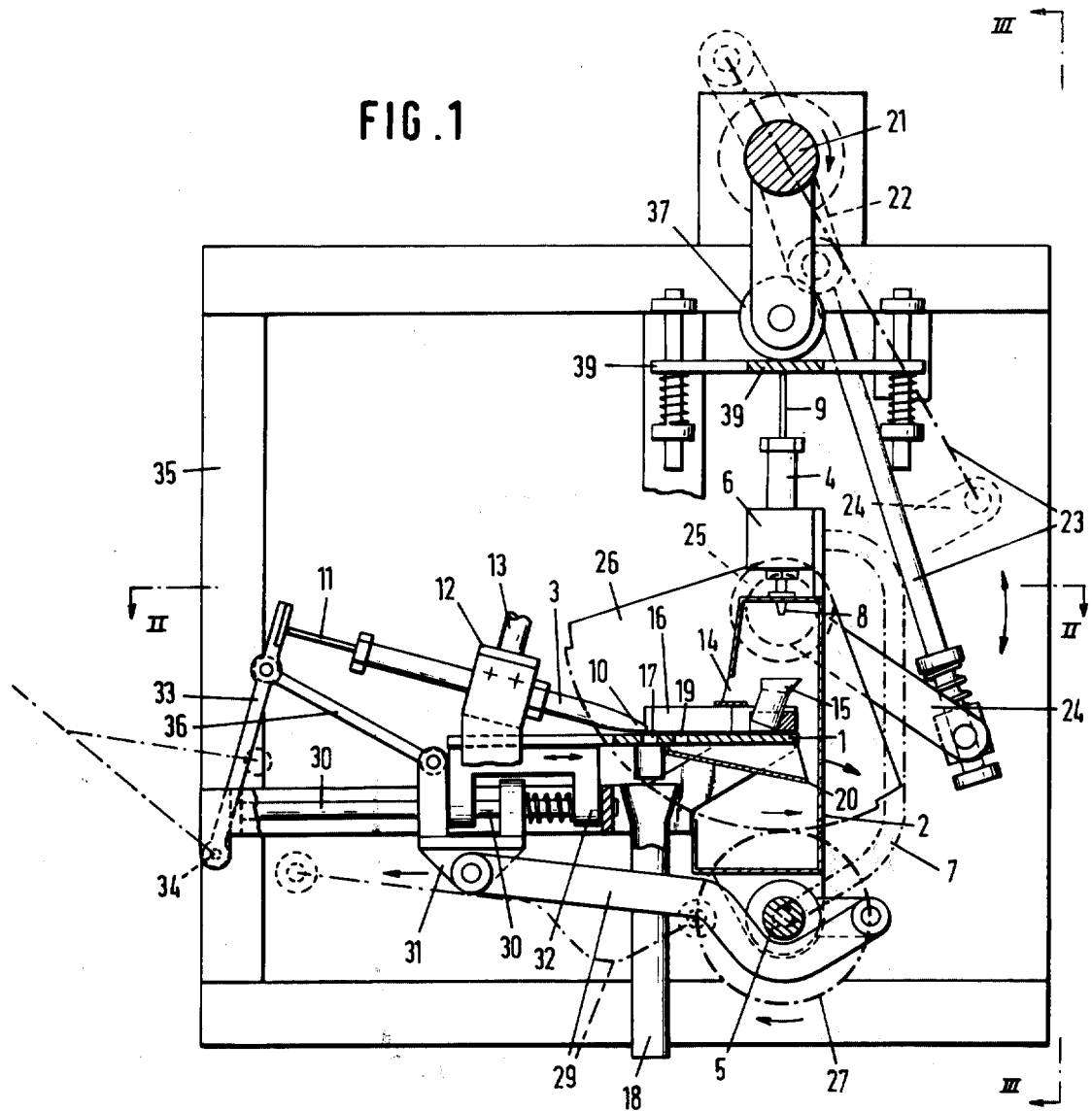

United States Patent [19]

Visser

[11] 4,004,713
[45] Jan. 25, 1977

[54] METHOD AND APPARATUS FOR DOSING SEED

[75] Inventor: Anthony Visser, 's-Gravendeel, Netherlands

[73] Assignee: Visser Tuinbouwtechniek en Hout B.V., 's-Gravendeel, Netherlands

[22] Filed: Dec. 1, 1975

[21] Appl. No.: 636,646

[30] Foreign Application Priority Data

May 28, 1975 Netherlands ............ 7506282

[52] U.S. Cl. .......................... 221/211; 221/225
[51] Int. Cl.² ................................ B23Q 7/04
[58] Field of Search .......... 221/211, 225, 233, 234, 221/235, 236; 111/1

[56] References Cited
UNITED STATES PATENTS

| | | | |
|---|---|---|---|
| 3,511,016 | 5/1970 | Craig | 221/211 |
| 3,738,530 | 6/1973 | Fine | 221/211 |
| 3,750,832 | 8/1973 | Ovarnstrom | 221/211 |
| 3,820,666 | 6/1974 | Nye | 221/211 |

*Primary Examiner*—Allen N. Knowles
*Attorney, Agent, or Firm*—Browdy and Neimark

[57] ABSTRACT

A method and apparatus for the dosed sowing of seed comprising periodically immersing a first hollow suction tube in a supply of seeds, retaining a limited number of seeds at the tube end by creating underpressure inside said tube, bringing the suction tube above a substantially horizontal strip, on which the seeds retained at the tube end are dropped by removal of the vacuum, after which the strip with the seeds lying thereon is moved relative to a narrowing channel in such a manner that in the narrowest part of the channel there comes to lie each time only one seed, which seed is taken up by a second suction tube and transferred to a nutrient substrate, while the rest of the seeds lying on the strip are returned to the supply.

10 Claims, 4 Drawing Figures

METHOD AND APPARATUS FOR DOSING SEED

The invention relates to a method of dosed sowing of seed.

Tomato seed, lettuce seed and the like are extremely expensive, so that the sowing thereof should be done in accurate doses. There are known methods and apparatuses for separating each time only one seed from a supply thereof, in which cases, however, it is necessary to subject the seeds to a pretreatment, in particular coating, so that the individual seeds can move independently of each other and adhesion thereof, which is the case with some kinds of seeds, is avoided. Moreover, the distinction between substantially oval-shaped seed and elongated seed as regards the mobility of the individual seeds is minimized.

The object of the invention is a dosing method, in which an accurate dosage is possible without it being necessary for the seeds to be pretreated.

For this purpose the invention comprises the steps of periodically immersing a first hollow suction tube in a supply of seeds, retaining a limited number of seeds at the tube end by creating under-pressure inside said tube, bringing the suction tube above a substantially horizontal strip, on which the seeds retained at the tube end are dropped by removal of the vacuum, after which the strip with the seeds lying thereon is moved relative to a narrowing channel in such a manner that in the narrowest part of the channel there comes to lie each time only one seed, which seed is taken up by a second suction tube and transferred to a nutrient substrate, while the rest of the seeds lying on the strip is returned to the supply.

So, in the method according to the invention the taking up of the seeds is carried out in two phases, namely first with one or more suction tubes having a comparatively wide opening and subsequently with one or more suction of a second series having a comparatively narrow opening. This ensures that each time actually seeds are taken from the supply, which is not certain if one would try to take each time only one seed from a large supply with a fine suction tube at once. Moreover, it is possible to adapt the shape of the narrowing channel to the shape of the seeds concerned (round, elongated etc.).

In a further elaboration of the invention it is possible to immerse the first suction tube in the seed supply while it is present in a part of a reservoir, after which the reservoir is tilted so that the supply is moved to an other part of the reservoir remote from the suction tube, so that it is possible for this suction tube to drop the seeds collected thereon onto the strip out of the reach of the supply. By using a tilting reservoir the seed remains in motion, as a result of which adhesion and agglomeration of the seeds is prevented.

Furthermore it is possible according to the invention to drop the seeds taken from the supply by the first suction tube or tubes onto the strip via a stop surface extending obliquely into the path of fall of the seeds, as a result of which is prevented that seeds fall onto the strip on each other and remain stacked.

For carrying out the method according to the invention use can be made of an apparatus which is characterized by a substantially horizontal strip reciprocating between two end positions, in which one end position the strip extends with one end under the end of at least one hollow suction tube wherein optionally an under-pressure can be created, and with the other end under the end of at least one second suction tube, the end of the second suction tube being positioned between two guide walls which extend substantially perpendicular to the strip, thereabove, and from the end of the second suction tube divergently into the direction of the first suction tube, and the length of the movement of the strip being sufficient to bring the strip zone, which in said end position is positioned under the first suction tube, to under or beyond the end of the second suction tube.

For adaption to the shape of the various seeds it is possible according to the invention to make the divergence of the guide walls adjustable.

Furthermore it is possible according to the invention that in the end position, wherein a strip portion is located under the first suction tube, there is located an opening provided in the strip under the end of the second suction tube above a channel extending from the strip to a nutrient substrate for the seeds. So, while the seeds are released by the first suction tube and fall on the strip, the single seed taken up by the second suction tube is released thereby and can fall in the nutrient substrate via the opening in the strip and said channel. Subsequently the strip moves into the direction of the second suction tube, so that the seeds placed on the strip by the first suction tube are guided between the guide walls in such a manner that ultimately one single seed is brought before the opening of the second suction tube. The suction tube takes up this seed and the strip can move backwards to the other end position in order to receive a number of seeds from the first suction tube again. During the backward movement the seeds on the strip which are not taken up by the second suction tube can fall back into the reservoir via a second opening in the strip and a guide plate positioned under the strip.

Some embodiments of the seed dosing apparatus according to the invention will now be described, by way of example, with reference to the accompanying drawings, wherein.

Figure 2:
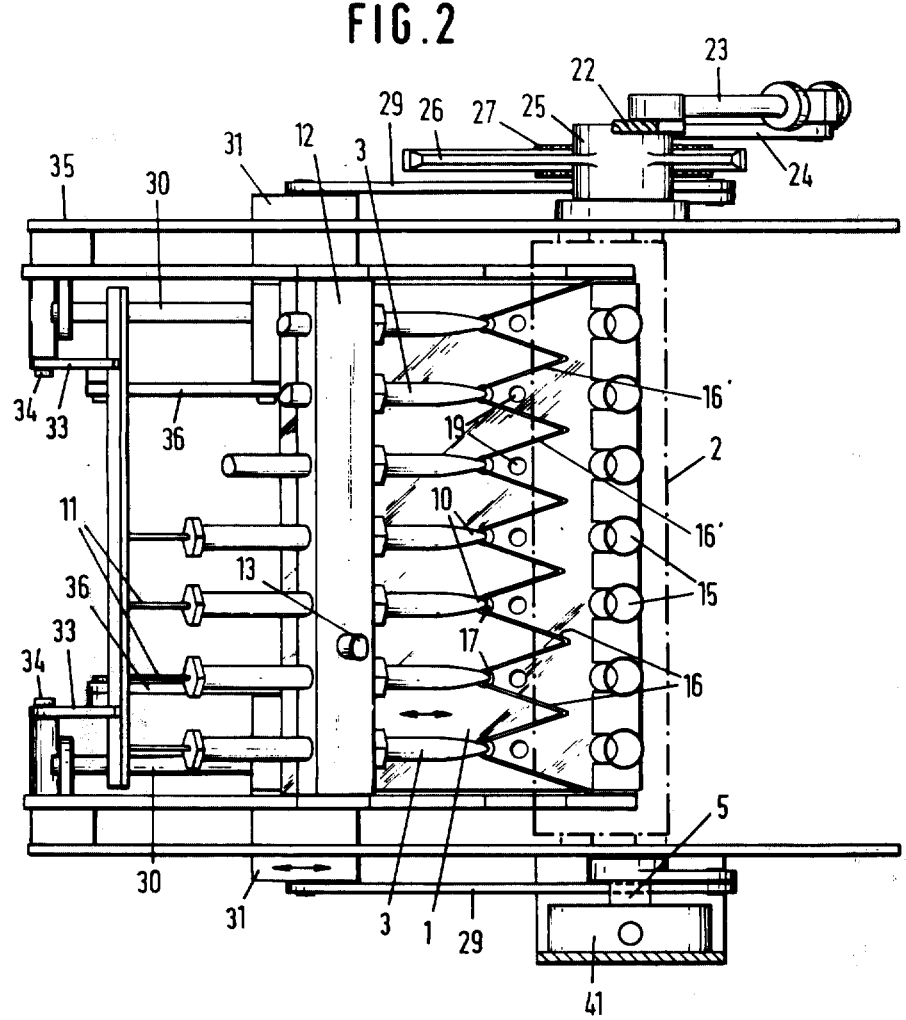
Figure 3:
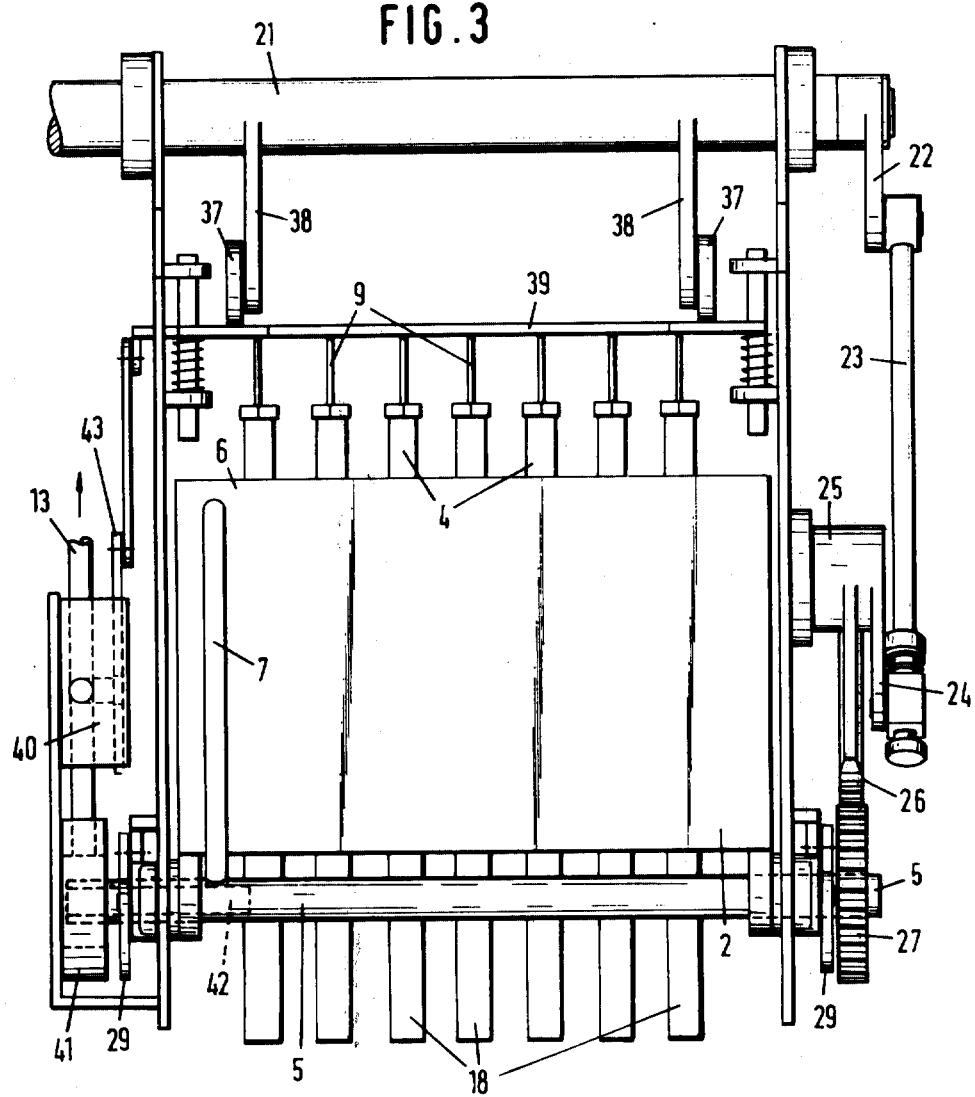
Figure 4:
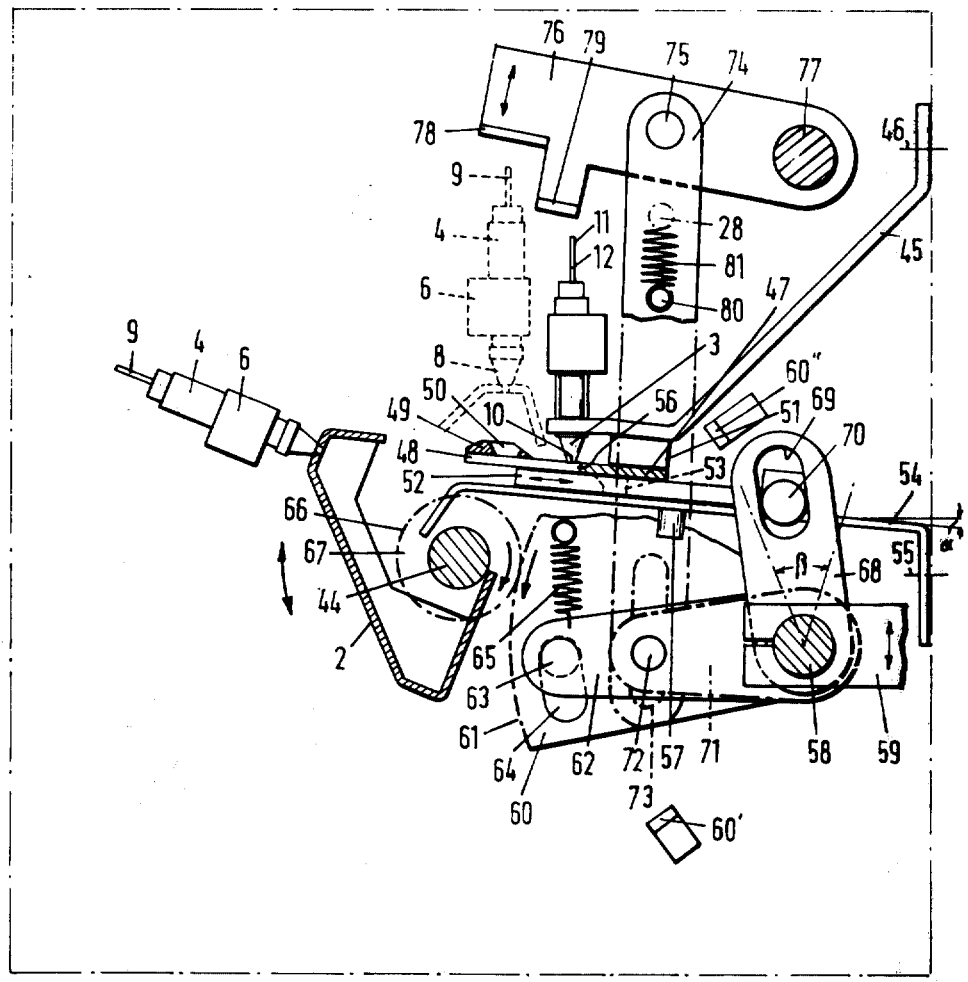

FIG. 1 is a schematic side view of the apparatus,
FIG. 2 is a view on line II—II in FIG. 1,
FIG. 3 is a view on line III—III in FIG. 1, and
FIG. 4 shows a variant of the seed dosing apparatus.

In the embodiment according to FIGS. 1-3 a strip 1 is reciprocating between the position as shown in FIG. 1 wherein strip 1 extends with its right end into a seed reservoir 2 and a position wherein the right end of strip 1 is situated under a plurality of suction tubes 3. A plurality of suction tubes 4 is connected with reservoir 2 at the upper wall thereof, which combination is tiltable about shaft 5, the upper position being shown in FIG. 1. Suction tubes 4 (of the first series) are hollow and are connected to means 6, 7 to create an under-pressure in tube 4. Tubes 4 each terminate in a nozzle 8, through which can extend an ejector pin 9 in such a manner that the under-pressure prevailing at nozzle 8 is removed. Suction tubes 3 (of the second series) are also hollow, terminate in nozzles 10 wherein fit ejector pins 11, and are connected to means 12, 13 for creating an under-pressure in suction tubes 3 and at the nozzles 10 thereof.

Seed reservoir 2 is provided with a side opening 14. In the position as shown in FIG. 1, the upper tilting position, the right end of strip 1 extends into reservoir 2 through opening 14 and is then located under a series of stationary funnels which are positioned slightly inclined under nozzles 8 of suction tubes 4 of the first series. Furthermore (see FIG. 2) there extend guide walls 16, 16' above strip 1, which walls 16, 16' from each nozzle 10 diverge towards the right-hand side.

In strip 1 there are provided in the vertical plane through the central axis of each suction tube 3 two openings. Opening 17 is located, in the most right position of strip 1 as shown, under nozzle 10 of suction tube 3 and above discharge channel 18 which leads to a nutrient substrate for seeds. Second opening 19 is located between opening 17 and the right end of strip 1. Under openings 19 there extends a guide plate 20.

The operation of apparatus according to FIGS. 1–3 is in principle as follows.

From the position as shown, wherein a quantity of seed is at the bottom of reservoir 2, reservoir 2 is tilted to the right until suction tubes 4, at least nozzles 8 thereof, are immersed in the supply of seed, at least are contacted therewith. In each suction tube 4 prevails an under-pressure and the respective ejector pin 9 is withdrawn, so that the under-pressure also prevails at nozzle 8. Nozzle 8 is so dimensioned that under the influence of the under-pressure a limited number of seeds, three or four, stick thereto. Reservoir 2 is tilted back to the upper position as shown in FIG. 1, so that each nozzle 8 with the seeds sticking thereto is situated above a funnel 15. Meanwhile strip 1 has moved to the right and is situated with its right end under funnels 15. The under-pressure in suction tubes 4 is removed and the ejector pins are ejected, so that the seeds fall from nozzles 8 through the respective funnels 15 onto strip 1, each time between pairs of guide walls 16, 16'. Strip 1 is moved to the left, as a result of which the seeds lying at the right end thereof are drawn into the to the left narrowing (FIG. 2) channels confined by guide walls 16, 16'. The movement of the strip is such that the seeds are brought within the sphere of interest of the under-pressure prevailing at each of nozzles 10. The spacing between walls 16 and 16' at each nozzle 10 is so selected that only one seed fits therebetween. This seed is sucked onto the respective nozzle 10, which nozzles are finer than nozzles 8.

After strip 1 has moved again to the right, the under-pressure at nozzle 10 is removed when each opening 17 is situated under a suction nozzle 10, with thereon a seed, by expulsion of the relative pin 11, so that the seed can fall through opening 17 via discharge channel 18 into the nutrient substrate present thereunder. Seeds which are not taken up by suction nozzles 10 can fall back again into reservoir 2 via openings 19 and guide plate 20 during movement of strip 1 do the right. The release of taken-up seeds from suction nozzles 8 and 10 of the first and second series of suction tubes, respectively, can take place simultaneously when strip 1 is in the most right position and reservoir 2 is in the upper position. The take-up of the seeds takes place at the suction nozzles 8 when reservoir 2 is in the lower tilting position, and simultaneously at suction nozzles 10 when strip 1 is in the most left position.

It will be obvious that the time-controlling of the movement of the various parts of the apparatus can be effected in different ways. For example, use can be made of cam controls for the tilting movement of reservoir 2 and for the reciprocal movement of strip 1. For the expulsion of ejector pins 9 and 11 of the first suction tube series 4 and the second suction tube series 3, respectively, use can be made of Bowden cables.

In the drawing is shown an embodiment of the apparatus wherein all movements are derived from a main shaft 21.

For the tilting movement of seed reservoir 2 there is connected to the main shaft 21 a crank 22 which via a driving rod 23 is resiliently coupled with a crank 24 of a shaft 25. On shaft 25 there is attached a gear wheel, at least a gear wheel sector, 26. Gear wheel 26 engages with a gear wheel 27 connected with tilting shaft 5 of reservoir 2.

For the linear movement of strip 1 there are provided on shaft 5 cranks 28 connected with driving rods 29 for reciprocating slides 31 on shafts 30, which slides can co-operate with slides 32 connected with strip 1.

The operation of ejector pins 11 of suction tubes 3 is effected by means of arms 33, which at 34 are bearing-mounted in frame 35 of the apparatus. The movement of arms 33 is controlled by arms 36, derived from the movement of slides 31.

Ejector pins 9 of suction tubes 4 are controlled by means of rollers 37 which are bearing-mounted on cranks 38 of the main shaft 21. Rollers 37 can be brought into contact with a stop plate 39, which is connected to all ejector pins 9.

For creating an under-pressure in suction tubes 4 and 3 there is provided a central chamber 40, wherein an under-pressure can be created by means of a vacuum pump. Chamber 40 is connected via line 13 to block 12 wherein suction tubes 3 are mounted. Chamber 40 is also connected to a hollow bearing 41, the inner space of which communicates with an axial channel 42 inside shaft 5. Channel 42 is connected via line 7 to block 6 wherein suction tubes 4 are mounted. Therefore, in all tubes 3 and 4 there prevails at a certain moment the under-pressure of central chamber 40. The under-pressure in chamber 40, and consequently also in all the suction tubes, can be removed by opening chamber 40. This is done automatically by means of a valve 43, which is connected to stop plate 39. Therefore, when plate 39 is pressed downwards, not only ejector pins 9 of suction tubes 4 are operated but also the under-pressure is removed in all suction tubes 3 and 4. This situation is shown in FIG. 1 wherein strip 1 is in the most right position, reservoir 2 is tilted in the upper position, nozzles 8 are situated above funnels 15, nozzles 10 are situated above openings 17 and discharge channels 18, and ejector pins 11 are expelled by means of the system of arms 33, 36 controlled by slide 31.

It will be obvious that the invention is not restricted to the above-described embodiment but that modifications within the scope of the invention are possible, in the sense that for the control of the various parts of the apparatus various known driving constructions can be used.

For example, in the embodiment of the seed dosing apparatus according to FIGS. 1–3 suction tubes 3 of the second series are arranged slightly inclined to the horizontal and nozzle 10 is positioned between guide walls 16 in the zone of the shortest distance between said walls. For elongated seeds, such as lettuce seed, this construction is excellently suitable, especially when the angle of divergence between guide walls 16 is adjustable for adaptation to the specific shape of the seeds.

In practice it has now been found that for seeds having a less elongated, so more round, shape, such as tomato and paprika seed, a different arrangement of suction tubes 3 of the second series, namely a vertical one, gives more favourable results.

This variant is shown in FIG. 4, wherein moreover the drive of the various moving parts of the seed dosing apparatus is simpler than in the apparatus according to FIGS. 1-3. It will be clear that intermediate solutions are possible within the scope of the invention. For example, the vertical arrangement of the tubes according to FIG. 4 can be combined with the drive according to FIGS. 1-3 and the other way round.

As shown in FIG. 4, a seed reservoir 2 having thereon suction tubes 4 of the first series is tiltable to and fro over about 180° about a shaft 44. As in the embodiment according to FIGS. 1-3, the tubes 4 are mounted in a block 6, via which block a vacuum is created inside the tubes and in each suction tube 4 there is provided an ejector pin 9. The drive of seed reservoir 2 and the operation of pins 9 will be further entered into.

Suction tubes 3 of the second series are mounted vertically and stationary on a bracket 45, which at 46 is rigidly attached to the frame of the apparatus. Nozzles 10 of tubes 4 of the second series are positioned between substantially V-shaped holes in a strip 47. In FIG. 4 one of the boundary walls 48 of a hole 47 is indicated. Above strip 47 there is arranged a strip 49 provided with funnel-shaped passages 50, which have the same function as funnels 15 in the embodiment according to FIGS. 1-3. Strips 47 and 49 are connected to bracket 45 via lips 51. Strips 47 can be replaced by strips having holes of a different configuration for adaptation to the specific seed shape.

Under strip 47 there is movable to and fro a strip 52, for example made of synthetic material. Strip 52 has the same function as strip 1 according to FIGS. 1-3 and is provided with openings 53 having the same function as openings 17.

Strip 52 is slidable to and fro on a stationary plate 54, which at 55 is rigidly attached to the frame of the apparatus. The part of plate 54 whereon strip 52 slides to and fro is inclined at a slight angle α to the horizontal.

In the most left position of strip 52 an opening 53 is located under a nozzle 10 and a nozzle 8 is located above a funnel opening 50. Now, by operating the respective ejector pin 9 of nozzle 8 a number of seeds can be released and fall via funnel 50 and the wide portion of a hole 48, 48 positioned thereunder onto the part of strip 52 lying thereunder. Subsequently seed reservoir 2 can make a tilting movement and strip 52 is moved to the right. The seeds lying thereon are drawn to the right between the converging guide walls 48 and one of the seeds will ultimately come under a nozzle 10 of tubes 3 of the second series and be sucked onto it. When continuing the movement of strip 52 to the right, the remaining seeds are scraped from strip 52 by the narrow end 56 of the hole between walls 48 and fall to the left thereof onto plate 54.

Now, when subsequently strip 52 is moved to the left, these seeds are pushed from plate 54 and fall into seed reservoir 2.

The movement of strip 52 is now reversed. It moves to the right until opening 53 is located under nozzle 10. The single seed sucked onto it is released by operating pin 11 and falls via opening 53 onto plate 54. When continuing the movement of strip 52 to the right, opening 53 is brought above a tube stub 57, which is rigidly attached to plate 54 and ends above a discharge channel 18 (see FIGS. 1-3). By means of this movement the seed lying on plate 54 inside opening 53 is carried to tube stub 57.

The drive of the various members is effected as follows.

A shaft 58 is periodically rotated to and fro by means of a lever 59, which can be driven in any desired known manner.

Loosely rotatable on shaft 58 is arranged a gear segment having teeth 61. An arm 62 attached rigidly on shaft 58 engages with a pin 63 in a slot 64 in segment 60 and is connected thereto by means of a tension spring. So, when shaft 58 is moved to and fro over an angle β, segment 60 is moved up and down. Teeth 61 thereof engage with teeth 66 of a gear wheel 67 attached to the tilting shaft 44 of seed reservoir 2, which itself is tilted over 180° when shaft 58 is moved over an angle β.

Gear segment 60 can be swivelled between two stops 60' and 60".

A second arm (or pair of arms) 68 drives strip 52, for which purpose arm 68 is provided with a slot 69. In slot 69 engages a cross pin 70, which is connected to strip 52.

A third arm 71 is rigidly attached on shaft 58 and engages with a pin 72 in a slot 73 in a strip 74, which by means of a pivot pin 75 is connected to a tilting block 76, which can be swivelled about a shaft 77. Block 76 is provided with stops 78 and 79 for the ejector pins 9 and 11 of the first and second series of suction tubes, respectively. So, these are operated simultaneously for releasing seeds from nozzle 8 (which seeds fall then through funnels 50 onto the part of strip 52 lying thereunder) and from nozzle 10 (which seeds fall onto plate 54 via openings 53).

In order to ensure that normally block 76 is kept free at distance above pins 9 and 11, strip 74 is connected to the end of a tension spring 81 via a projection 80, the other end of which spring is connected to the frame of the apparatus via a projection 82.

I claim:
1. A method of dosed sowing of seed, characterized by periodically immersing a first hollow suction tube in a supply of seeds, retaining a limited number of seeds at the tube end by creating under-pressure inside said tube, bringing the suction tube above a substantially horizontal strip, on which the seeds retained at the tube end are dropped by removal of the vacuum, after which the strip with the seeds lying thereon is moved relative to a narrowing channel in such a manner that in the narrowest part of the channel there comes to lie each time only one seed, which seed is taken up by a second suction tube and transferred to a nutrient substrate, while the rest of the seeds lyig on the strip are returned to the supply.

2. A method according to claim 1, characterized in that the first suction tube is immersed in the seed supply while it is present in a part of a reservoir, after which the reservoir is tilted so that the supply is moved to an other part of the reservoir remote from the suction tube, and it is possible for this suction tube to drop the seeds collected thereon onto the strip out of the reach of the supply.

3. A method according to claim 1, characterized by dropping the seeds taken from the supply by the first suction tube or tubes onto the strip via a stop surface extending obliquely into the path of fall thereof.

4. An apparatus for the dosed sowing of seed, characterized by a substantially horizontal strip reciprocating between two end positions, in which one end position the strip extends with one end under the end of at least one hollow suction tube wherein optionally an underpressure can be created, and with the other end under the end of at least one second suction tube, the end of the second suction tube being positioned between two guide walls which extend substantially perpendicular to the strip, thereabove, and from the end of the second suction tube divergently into the direction of the first suction tube, and the length of the movement of the strip being sufficient to bring the strip zone, which in said end position is positioned under the first suction tube, to under or beyond the end of the second suction tube.

5. An apparatus according to claim 4, characterized in that the divergence of the guide walls is adjustable.

6. An apparatus according to claim 4, characterized in that under the or each first suction tube there is arranged an inclined funnel.

7. An apparatus according to claim 4, characterized in that in the end position, wherein a strip portion is located under the first suction tube, there is located an opening provided in the strip under the end of the second suction tube and above a channel extending from the strip to a nutrient substrate for the seeds.

8. An apparatus according to claim 4, characterized in that the first suction tube is rigidly attached to the end wall of a supply reservoir which, with the exception of an opening in a side wall, is closed and is periodically tiltable between on the one hand a position wherein the first suction tube is situated substantially above the wide portion of the channel formed by the guide walls, in particular above the inclined funnel, and on the other hand a position wherein the free end of the first suction tube is immersed in a supply of seeds, or other material to be dosed, present in the reservoir.

9. An apparatus according to claim 7, characterized by a second opening in the strip situated between the end of the strip, which can be brought under the inclined funnel, and the opening, which can be brought under the end of the second suction tube, a guide plate extending from the bottom side of the second opening at an angle into the direction of said strip end.

10. An appartus according to claim 4, characterized in that each first suction tube has a wider end bore than each second suction tube, the hollow inner space of all tubes is connected to a source of under-pressure, and needle-shaped ejector pins extend into the suction tubes, which needles fit in the respective end bores and are movable therethrough time-controlled.

* * * * *